United States Patent
Goslin et al.

(10) Patent No.: US 10,555,153 B2
(45) Date of Patent: Feb. 4, 2020

(54) SYSTEMS AND METHODS FOR MAKING NON-SMART OBJECTS SMART FOR INTERNET OF THINGS

(71) Applicant: Disney Enterprises, Inc., Burbank, CA (US)

(72) Inventors: Michael P. Goslin, Burbank, CA (US); Blade Olson, Burbank, CA (US); Timothy Panec, Burbank, CA (US); Katherine M. Bassett, Burbank, CA (US); Thomas McWilliams, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 269 days.

(21) Appl. No.: 15/446,736

(22) Filed: Mar. 1, 2017

(65) Prior Publication Data

US 2017/0257270 A1    Sep. 7, 2017

Related U.S. Application Data

(60) Provisional application No. 62/302,113, filed on Mar. 1, 2016.

(51) Int. Cl.
| | |
|---|---|
| *G06F 15/16* | (2006.01) |
| *H04W 4/80* | (2018.01) |
| *H04L 29/08* | (2006.01) |
| *H04W 8/22* | (2009.01) |

(52) U.S. Cl.
CPC ............ *H04W 4/80* (2018.02); *H04L 67/125* (2013.01); *H04L 67/34* (2013.01); *H04W 8/22* (2013.01)

(58) Field of Classification Search
CPC . H04L 41/0813; H04L 41/145; H04L 67/125; H04L 67/34; H04W 4/80; H04W 8/22; G08B 7/06
USPC ........................................................ 709/221
See application file for complete search history.

(56) References Cited

U.S. PATENT DOCUMENTS

| | | | | |
|---|---|---|---|---|
| 8,371,897 | B1* | 2/2013 | Wong ....................... | A63H 3/28 382/103 |
| 9,583,991 | B2* | 2/2017 | Iannello ................... | H02K 7/09 |
| 2003/0027636 | A1* | 2/2003 | Covannon ............... | G06F 3/002 463/42 |
| 2008/0247746 | A1* | 10/2008 | Law ..................... | F16M 11/041 396/419 |
| 2010/0167623 | A1* | 7/2010 | Eyzaguirre ............. | A63H 3/28 446/330 |

* cited by examiner

*Primary Examiner* — S M A Rahman
(74) *Attorney, Agent, or Firm* — Esplin & Associates, PC

(57) ABSTRACT

This disclosure relates to systems and methods for simulating an internet of things capability in an object. Storage media may store reactions executable by a wireless communication device. The wireless communication device may include one or more sensors and one or more feedback capabilities. Individual reactions may be characterized by reaction criteria detectable by the one or more sensors and reaction effects executable through the one or more feedback capabilities. One or more processors may be configured by machine readable instructions to receive input indicating an object association between the wireless communication device and the object, and, responsive to reception of the input, activate a set of reactions for the wireless communication device.

20 Claims, 5 Drawing Sheets

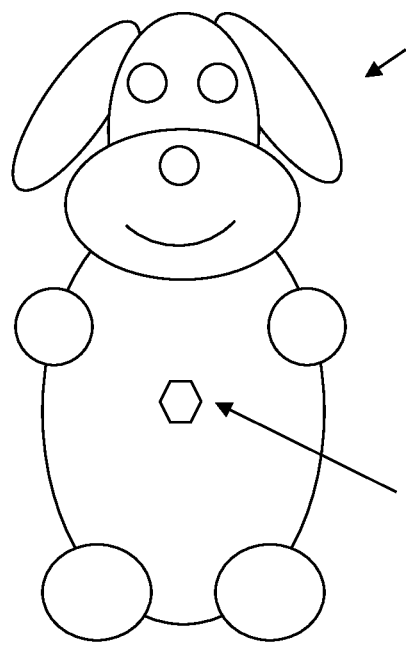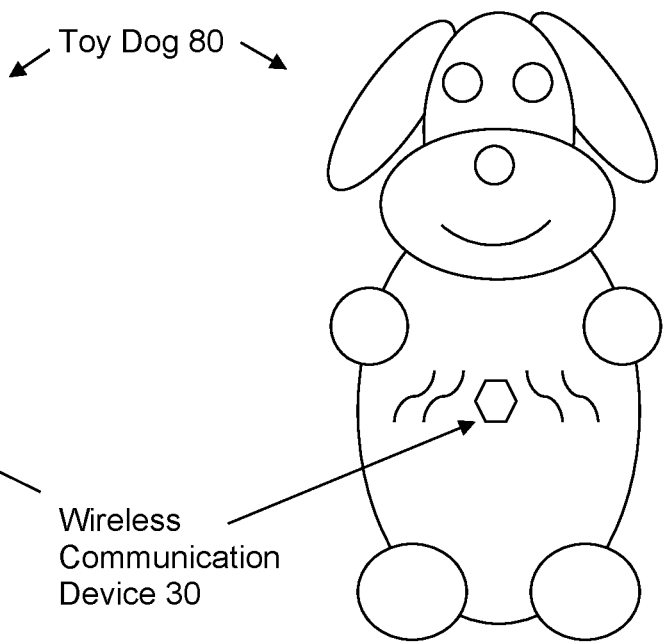
FIG. 3A        FIG. 3B
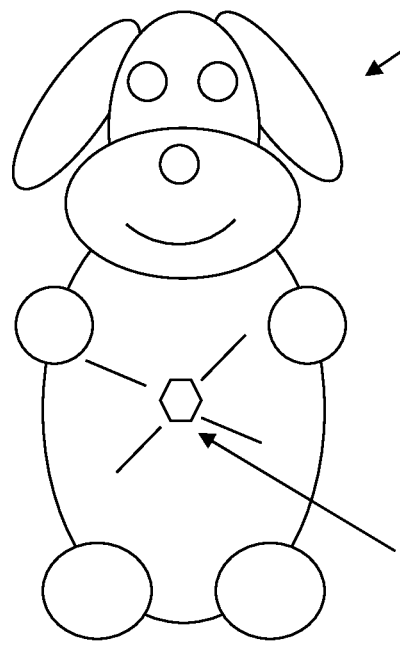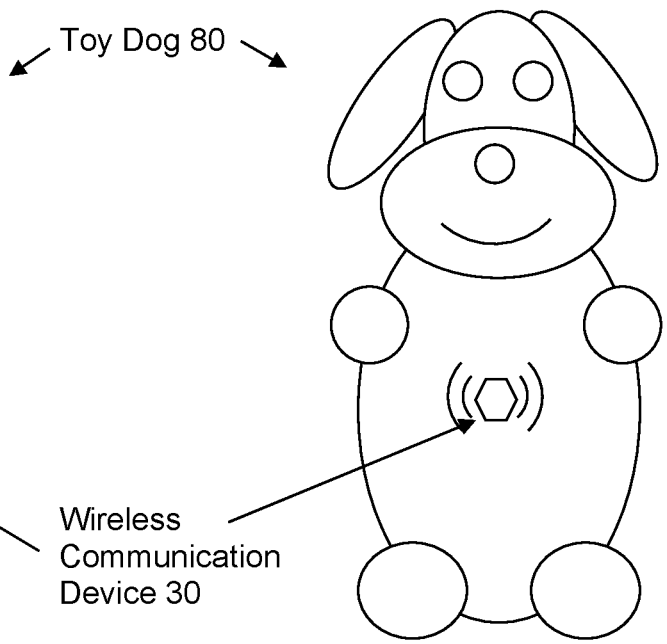
FIG. 3C        FIG. 3D

SYSTEMS AND METHODS FOR MAKING NON-SMART OBJECTS SMART FOR INTERNET OF THINGS

FIELD

This disclosure relates to systems and methods for simulates an internet of things capability in an object.

BACKGROUND

Non-smart objects (e.g., toys, appliances) may not have sensors that allow the non-smart objects to detect occurrences of certain events and react to occurrences of such events. Modifying the non-smart objects to include sensors and logic to react to occurrences of events may be time-consuming, costly, and/or not practical.

SUMMARY

This disclosure relates to simulating an internet of things capability in an object. The wireless communication device may include one or more sensors and one or more feedback capabilities. Storage media may store reactions executable by a wireless communication device. Individual reactions may be characterized by reaction criteria detectable by the one or more sensors and reaction effects executable through the one or more feedback capabilities. Input indicating an object association between the wireless communication device and the object may be received. Responsive to reception of the input, a set of reactions for the wireless communication device may be activated. The wireless communication device may execute reactions effects based on detection of reaction criteria such that the object appears to be executing the reactions.

A wireless communication device may include one or more sensors. In some implementations, the one or sensors may include one or more of an image sensor, an audio sensor, a temperature sensor, a humidity sensor, a proximity sensor, a pressure sensor, an accelerometer, an angular rate sensor, a gyroscope, a geolocation sensor, a magnetometer, a vibration sensor, a light detection sensor, a physiological sensor, and/or other sensors. In some implementations, the one or more sensors may include one or more of a radio communication device, a Bluetooth communication device, a Wi-Fi communication device, a cellular communication device, an infrared communication device, and/or other communication device.

The wireless communication device may include one or more feedback capabilities. In some implementations, the one or more feedback capabilities may include one or more capabilities to generate of one or more of a haptic feedback, a visual feedback, and/or an audio feedback. In some implementations, the wireless communication device may include one or more of a haptic generator, a display, and/or a speaker.

In some implementations, the wireless communication device may be attachable to the object. In some implementations, the wireless communication device may be attachable to the object via one or more of an adhesive, a hook, a clip, a magnet, and/or a pin.

A system that simulates an internet of things capability in an object may include one or more of storage media, one or more physical processors, and/or other components. The storage media may store reactions executable by the wireless communication device. Individual reactions may be characterized by reaction criteria detectable by the one or more sensors and reaction effects executable through the one or more feedback capabilities, The reactions may include a first reaction characterized by first reaction criteria and a first reaction effect, and/or other reactions characterized by other reaction criteria and other reaction effects.

The one or more physical processors may be configured by machine-readable instructions. Executing the machine-readable instructions may cause the one or more physical processors to facilitate simulating an internet of things capability in an object. The machine-readable instructions may include one or more computer program components. The computer program components may include one or more of an input component, a reaction component, and/or other computer program components. In some implementations, the one or more processors may be located in the wireless communication device. In some implementations, the one or more processors may be located remotely from the wireless communication device.

The input component may be configured to receive input indicating an object association between the wireless communication device and the object and/or other information. The object association may indicate an object type and/or an object role for the object. An object type may define a characteristic of an object. An object role may define an internet of things role to be simulated by an object.

The reaction component may be configured to, responsive to reception of the input, activate a set of reactions for the wireless communication device that is specific to the object type and/or the object role indicated in the received input. The set of reactions may include the first reaction which causes the wireless communication device to execute the first reaction effect through the one or more feedback capabilities in response to detection of the first reaction criteria so that the object appears to be executing the first reaction effect.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIGS. 3A-3D illustrates examples of a wireless communication device executing reactions through feedback capabilities to simulate an internet of things capability in a toy dog.

DETAILED DESCRIPTION

Figure 1:
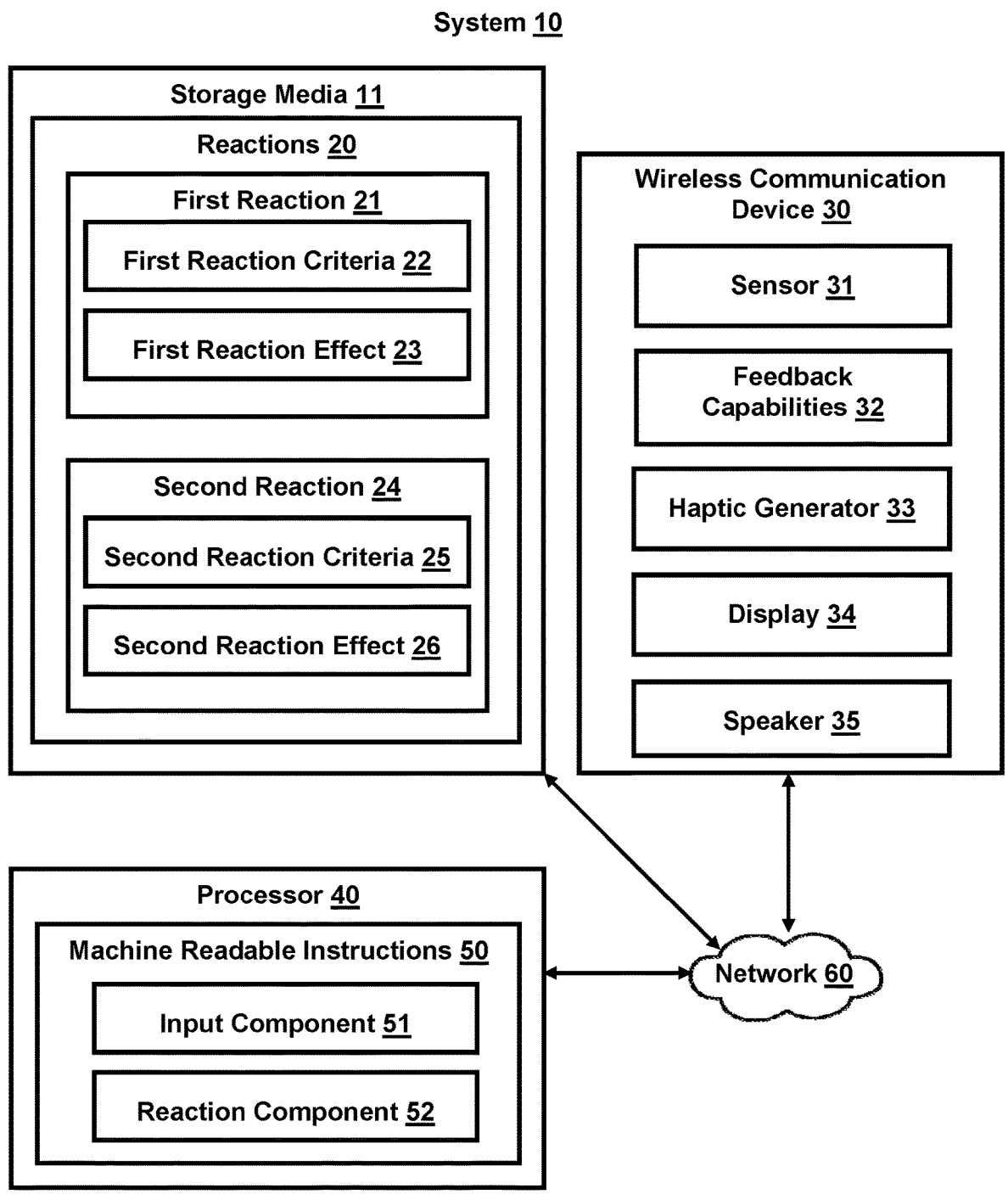
FIG. 1 illustrates a system for simulating an internet of things capability in an object.

FIG. 1 illustrates a system 10 for simulating an internet of things capability in an object. System 10 may include one or more of storage media 11, wireless communication device 30, processor 40, and/or other components. Storage media 11, wireless communication device 30, processor 40, and/or other components of system 10 may communicate with each other directly or may communicate with each other indirectly, such as through network 60. Storage media 11 may store reactions 20 executable by wireless communication device 30. Wireless communication device 30 may include a sensor 31 and one or more feedback capabilities 32. Individual reactions of reactions 20 may be characterized by reaction criteria detectable by sensor 31 and reaction effects executable through one or more feedback capabilities 32. Processor 40 may be configured by machine readable instructions 50 to receive input indicating an object association between wireless communication device 30 and the object, and, responsive to reception of the input, activate a set of reactions for wireless communication device 30.

Storage media 11 may include electronic storage media that electronically stores information. Storage media 11 may store software algorithms, information determined by processor 40, information received remotely, and/or other information that enables system 10 to function properly. For example, storage media 11 may store information relating to reactions, information relating to feedback capabilities, and/or other information. System 10 may include electronic storage separate from storage media 11. Electronic storage separate from storage media may perform one or more of the functionalities of storage media 11 discussed above.

In some implementations, storage media 11 may be located in wireless communication device 30. In some implementations, storage media 11 may be located in or with processor 40. In some implementations, storage media 11 may be located in a server. In some implementations, storage media 11 may be located in a device connected to network 60. For example, storage media 11 may be located in a mobile device connected to network 60. Other locations of storage media 11 are contemplated.

Storage media 11 may store reactions 20 executable by wireless communication device 30. Individual reactions may be characterized by reaction criteria detectable by one or more sensors (such as sensor 31) and reaction effects executable through one or more feedback capabilities (such as one or more feedback capabilities 32). Reaction criteria may include an occurrence of one or more events that may be detectable by one or more sensors (such as sensor 31). A reaction effect may define a feedback. A feedback may be generated through a feedback device. A feedback device may include one or more of haptic generator 23, display 34, speaker 35, and/or other feedback devices.

For example, storage media 11 may include reactions 20, and/or other reactions. Reactions 20 may include first reaction 21, second reaction 24, and/or other reactions. First reaction 21 may be characterized by first reaction criteria 22 and first reaction effect 23. Second reaction 24 may be characterized by second reaction criteria 25 and second reaction effect 26. First reaction 21 may be different from second reaction 24. First reaction criteria 22 may be different from second reaction criteria 25. First reaction effect 23 may be different from second reaction effect 26.

A wireless communication device may include one or more sensors. For example, as shown in FIG. 1, wireless communication device 30 may include sensor 31. Wireless communication device 30 may include other sensors. Sensor 31 may be configured to generate sensor output signals conveying sensor information. Sensor 31 may include one or more transducers or one or more communication devices. For example, sensor 31 may include one or more of image sensors, audio sensors, temperature sensors, humidity sensors, proximity sensors, pressure sensors, accelerometers, angular rate sensors, gyroscopes, geolocation sensors, magnetometers, vibration sensors, light detection sensors, physiological sensors, radio communication devices, Bluetooth communication devices, Wi-Fi communication devices, cellular communication devices, infrared communication devices, and/or other sensors/communication devices.

Reaction criteria may include an occurrence of one or more events that may be detectable by one or more sensors (such as sensor 31). An occurrence of one or more events may be detectable by one or more sensors at a time, over a period of time, at a location, or over a range of locations. For example, an occurrence of one or more events may include detection of one or more visuals by an image sensor, detection of one or more audio by an audio sensor, detection of one or more temperatures by a temperature sensor, detection of one or more humidity by a humidity sensor, detection of one or more proximities to one or more objects by a proximity sensor, detection of one or more pressures by a pressure sensor, detection of one or more accelerations by an accelerometer, detection of one or more angular speeds by an angular rate sensor, detection of one or more orientations by a gyroscope, detection of one or more locations by geolocation sensor, detection of one or more magnetic fields by a magnetometer, detection of one or more vibration by a vibration sensor, detection of one or more light by light detection sensor, detection of one or more conditions of a person by a physiological sensor, detection of one or more communication by a radio communication device, Bluetooth communication device, Wi-Fi communication device, cellular communication device, and/or infrared communication device, and/or detection of other events by other sensors/communication devices.

A wireless communication device may include one or more feedback capabilities. Feedback capabilities refer to one or more ways in which feedback may be generated at a time, over a period of time, at a location, or over a range of locations. Feedback may be defined by a reaction effect. Types of feedback may include one or more of visual feedback, audio feedback, haptic feedback, and/or other feedback. In some implementations, one or more feedback capabilities may include one or more capabilities to generate one or more haptic feedback, visual feedback, audio feedback, and/or other feedback.

A reaction effect may be executable through one or more feedback capabilities. A reaction effect may include one or more parameters that define generation of one or more feedback types. For example, a reaction effect may include one or more parameters that define generation of one or more of visual feedback, audio feedback, haptic feedback, and/or other feedback.

For example, as shown in FIG. 1, wireless communication device 30 may include one or more feedback capabilities 32. Wireless communication device 30 may include other capabilities or other capabilities. Feedback defined by one or more reactions effect may be generated through operation of one or more of a display, a speaker, a haptic generator, and/or other feedback devices. In some implementations, wireless communication device 30 may include one or more of haptic generator 33, display 34, and/or speaker 35.

Haptic generator 33 may be operated to generate feedback through one or more haptic effects. Operation of haptic generator 33 may be defined by a reaction effect. A haptic effects may refer to one or more information that may be observed haptically. A haptic effect may be static or dynamic (e.g., the intensity of haptic effect may vary over time), and may be haptically observable at a time, over a period of time, at a location, or over a range of locations. A haptic effect may include one or more of a vibration, a motion, a temperature, and/or other haptic effects.

Display 34 may be operated to generate feedback through one or more visual effects. Operation of display 34 may be defined by a reaction effect. A visual effect may refer to one or more information that may be observed visually. A visual effect may be static or dynamic, and may be visually observable at a time, over a period of time, at a location, or over a range of locations. A visual effect may include one or more of an image, a video, and/or other visual effects. In some implementations, display 34 may include one or more of a light source, a light emitting diode, a display screen, a smartphone, a tablet, a mobile device, a projector, and/or other displays.

Speaker 35 may be operated to generate feedback through one or more audio effects. Operation of speaker 35 may be defined by a reaction effect. An audio effect may refer to one or more information that may be observed audibly. An audio effect may be static or dynamic, and may be audibly observable at a time, over a period of time, at a location, or over a range of locations. An audio effect may include one or more of a sound, a music, a word, a sentence, and/or other audio effect.

In some implementations, wireless communication device 30 may be attachable to an object. For example, wireless communication device 30 may be attachable to an object via one or more of an adhesive, a hook, a clip, a magnet, and/or a pin. Other configurations and methods to attach wireless communication device 30 to an object is contemplated.

Processor 40 may be configured to provide information processing capabilities in system 10. As such, processor 40 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 40 may be configured to execute one or more machine readable instructions 50 to facilitate simulating an internet of things capability in an object. Machine readable instructions 50 may include one or more of input component 51, reaction component 52, and/or other components.

In some implementations, processor 40 may be located in wireless communication device 30. In some implementations, processor 40 may be located in a server. In some implementations, processor 40 may be located in a device connected to network 60. For example, processor 40 may be located in a mobile device connected to network 60. Other locations of processor 40 are contemplated.

Input component 51 may be configured to receive input indicating an object association between wireless communication device 30 and the object. Object association may be programmed into input component 51, updated by input component 51, obtained by input component 51 from storage media 11 or other electronic storage, obtained by input component 51 from remote location (e.g., a server, a network, etc.), and/or obtained by input component 51 in other ways. An object association may indicate an object type and/or an object role for the object.

An object type may define a characteristic of an object. The characteristic may be temporal or permanent. As non-limiting examples, an object type may include one or more of a stationary object, a moving object, a toy, a toy animal, a toy vehicle, a toy robot, a toy person, a toy tool, an appliance, a home appliance, a bag, a backpack, a watch, a jewelry, an instrument, a clothing, an armwear, a belt, a coat, a dress, a footwear, a gown, a headgear, a jacket, a neckwear, a suit, a robe, a cloak, a skirt, a shirt, a top, a trouser, shorts, a mechanical device, an electrical device, a wearable object, a holdable object, and/or other object types.

An object role may define an internet of things role to be simulated by an object. An object role may define a type of feedback expected from the internet of things role to be simulated by an object at a time, over a period of time, at a location, or over a range of locations. As non-limiting example, an object role may include one or more of a display feedback role, an audio feedback role, an haptic feedback role, and/or other feedback role.

Input indicating an object association may be received through wired communication, wireless communication, and/or an input device. For example, input indicating an object association may be received through wired communication with a device coupled to processor 40. As another example, input indicating an object association may be received through wireless communication with a wireless device (e.g., a mobile device, another wireless communication device, etc.) or with a device communicating through network 60. For example, system 10 may include wireless communication device 30 and a second wireless communication device. Wireless communication device 30 may receive input indicating an object association from the second wireless communication to duplicate and/or complement the object association of the second wireless communication device, or to select an object association separate and/or different from the object association of the second wireless communication device.

An input device may refer to a device that allows input of information. For example, an input device may include a key entry device, a touch entry device, an imaging device, a sound device, and/or other input devices.

A key entry device may include a device that receives input based on typing of one or more of characters, numbers, and/or other symbols. A key entry device may include a separate device or a part of another device. For example, a key entry device may include a keyboard/button coupled to processor 40. As another example, a key entry device may include a mobile device coupled to processor 40. Input indicating an object association may be received based on typing of one or more information regarding the object association on a key entry device.

A touch entry device may include a device that receives input based on touching of a user interface of the touch entry device. A touch entry device may include a separate device or a part of another device. For example, a touch entry device may include a touch screen coupled to processor 40. As another example, a touch entry device may include a mobile device coupled to processor 40. Input indicating an object association may be received based on touching of one or more portions of the touch entry device corresponding to one or more information regarding the object association.

An imaging device may include a device that receives input from an image sensor of the imaging device. An imaging device may include a separate device or a part of another device. For example, an imaging device may include an image sensor coupled to processor 40. As a non-limiting example, an imaging device may include an image sensor of sensor 31. As another example, an imaging device may include a mobile device coupled to processor 40. Input indicating an object association may be received from an imaging device with a field of view including one or more objects that include one or more information regarding the object association. For example, the field of view of the imaging device may be directed to a landmark, an augmented reality marker, and/or other objects that include one or more information regarding the object association.

A sound device may include a device that receives input through voice and/or sounds. A sound device may include a separate device or part of another device. For example, a sound device may include a microphone coupled to processor 40. As another example, a sound device may include a mobile device coupled to processor 40. Input indicating an object association may be received by a sound device based on voice and/or sound that include one or more information regarding the object association.

Reaction component 52 may be configured to, responsive to reception of the input by input component 51, activate a set of reactions for wireless communication device 30. The set of reactions may be specific to the object type and/or the object role indicated in the received input. Reaction component 52 may include or retrieve information (for example, a database, etc.) that matches a set of reactions to the object type and/or the object role indicated in the received input. A set of reactions may include a reaction which causes wireless communication device 30 to execute a reaction effect through one or more feedback capabilities 32 in response to detection of a reaction criteria so that the object appears to be executing the reaction effect.

For example, reaction component 52 may be configured to activate one or more reactions of reactions 20 (e.g., first reaction 21 and second reaction 24, etc.). Sensor 31 may detect satisfaction of first reaction criteria 22. In response, first reaction 21 may cause wireless communication device 30 to execute first reaction effect 23 through one or more feedback capabilities 32 so that the object appears to be executing first reaction effect 23. Sensor 31 may detect satisfaction of second reaction criteria 25. In response, second reaction 24 may cause wireless communication device 30 to execute second reaction effect 26 through one or more feedback capabilities 32 so that the object appears to be executing second reaction effect 26.

Figure 2A:
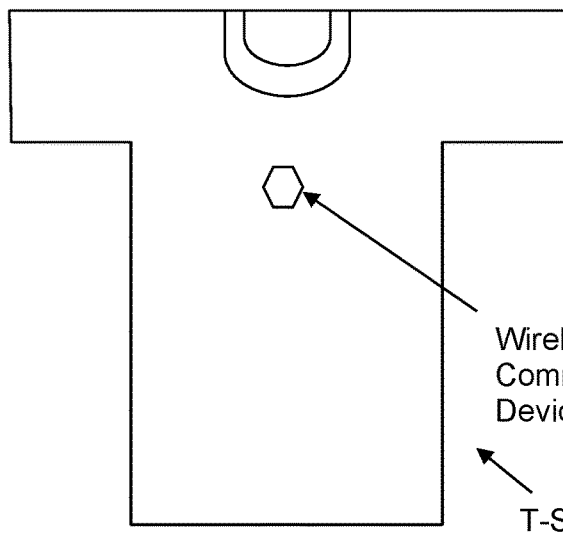
FIGS. 2A-2D illustrate examples of a wireless communication device executing reactions through feedback capabilities to simulate an internet of things capability in a t-shirt.
Figure 2B:
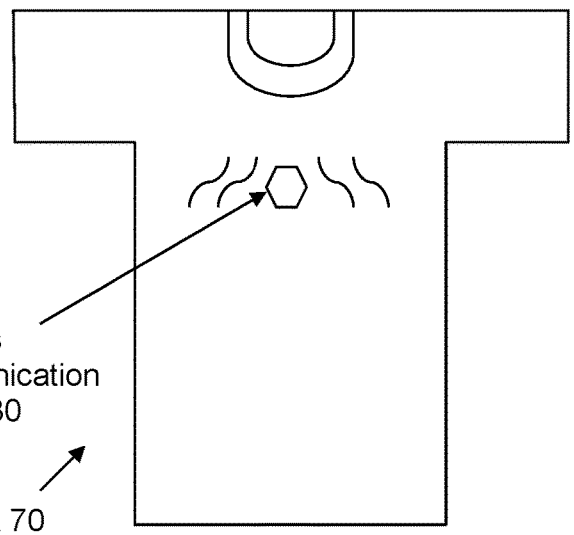
Figure 2C:
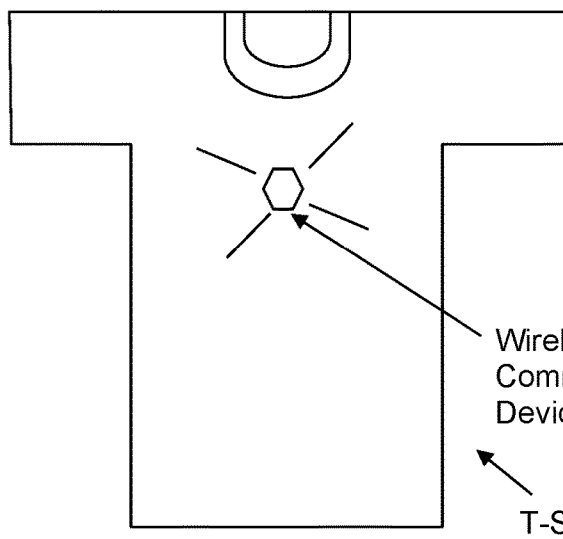
Figure 2D:
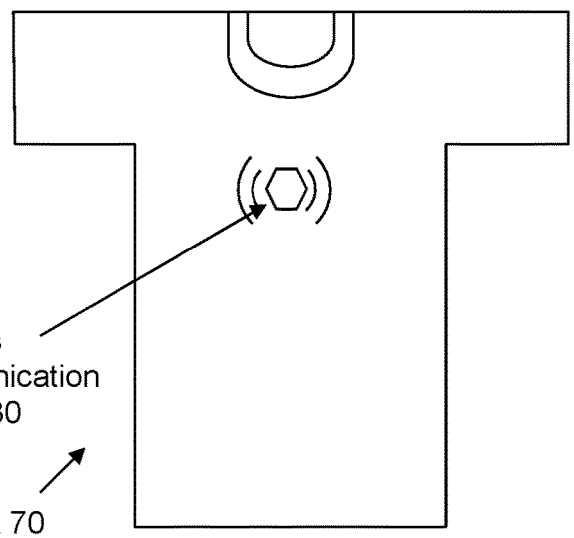

FIGS. 2A-2D illustrate non-limiting examples of wireless communication device 30 executing reactions through feedback capabilities 32 to simulate an internet of things capability in t-shirt 70. In FIG. 2A, wireless communication device 30 may be attached to t-shirt 70. Input component 51 may receive input indicating an object association between wireless communication device 30 and t-shirt 70. The object association between wireless communication device 30 and t-shirt 70 may include an object type of a shirt and an object role of a battle armor. Reaction component 52 may activate a set of reactions for wireless communication device 30. The set of reactions may be specific to the object type of a shirt and/or the object role of a battle armor.

Based on detection of one or more reaction criteria by sensor 31, one or more reaction effects may be executed through one or more feedback capabilities 32. For example, sensor 31 may detect that a virtual blaster fire from a toy gun has hit t-shirt 70 and/or wireless communication device 30 based on a detection of one or more infrared light by a light detection sensor and/or one or more communication from the toy gun. In response, one or more reaction effects may be executed through one or more feedback capabilities 32 of wireless communication device 30. For example, a reaction effect may define generation of a haptic feedback and haptic generator 33 may be operated to generate vibration to simulate t-shirt 70 shaking (shown in FIG. 2B). As another example, a reaction effect may define generation of a visual feedback and display 34 may be operated to generate light to simulate t-shirt 70 lighting up (shown in FIG. 2C). As another example, a reaction may define generation of an audio feedback and speaker 35 may be operated to generated audio to simulate t-shirt 70 making blaster hitting sounds (shown in FIG. 2D). Other types of reaction criteria and reaction effects are contemplated.

In some implementations, processor 40 may be located in wireless communication device 30. In some implementations, processor 40 may be located in a server. In some implementations, processor 40 may be located in a mobile device connected to a network. In some implementations, processor 40 may be located in the toy gun.

FIGS. 3A-3D illustrate non-limiting examples of wireless communication device 30 executing reactions through feedback capabilities 32 to simulate an internet of things capability in toy dog 80. In FIG. 3A, wireless communication device 30 may be attached to toy dog 80. Input component 51 may receive input indicating an object association between wireless communication device 30 and toy dog 80. The object association between wireless communication device 30 and toy dog 80 may include an object type of a toy dog and an object role of a pet. Reaction component 52 may activate a set of reactions for wireless communication device 30. The set of reactions may be specific to the object type of a toy dog and/or the object role of a pet.

Based on detection of one or more reaction criteria by sensor 31, one or more reaction effects may be executed through one or more feedback capabilities 32. For example, sensor 31 may detect that a person is speaking to toy dog 80 based on a detection of one or more audio by an audio sensor and/or one or more communication from a microphone. In response, one or more reaction effects may be executed through one or more feedback capabilities 32 of wireless communication device 30. For example, a reaction effect may define generation of a haptic feedback and haptic generator 33 may be operated to generate vibration to simulate toy dog 80 moving (shown in FIG. 3B). As another example, a reaction effect may define generation of a visual feedback and display 34 may be operated to generate light to simulate toy dog 80 responding through visual effect (shown in FIG. 3C). As another example, a reaction may define generation of an audio feedback and speaker 35 may be operated to generate audio to simulate toy dog 80 making barking sounds (shown in FIG. 3D). Other types of reaction criteria and reaction effects are contemplated.

In some implementations, processor 40 may be located in wireless communication device 30. In some implementations, processor 40 may be located in a server. In some implementations, processor 40 may be located in a mobile device connected to a network. In some implementations, processor 40 may be located in the microphone.

In some implementations, wireless communication device 30 may store information about executed reaction effects. In some implementations, information about executed reaction effects may be stored in other locations (e.g., storage media 11, network 60, etc.). Information about executed reaction effects may characterize the executed reaction effects at a time, over a period of time, at a location, or over a range of locations. For example, information about executed reaction effects may include the reactions, the reaction effects, the reaction criteria, the time(s) of reaction effects, the location(s) of reaction effects, and/or other information about the executed reaction effects.

In some implementations, reaction effects executed through one or more feedback capabilities 32 may be based on stored information about executed reaction effects. For example, referring to FIGS. 2A-2D, wireless communication device 30 may store information about one or more reaction effects executed in response to sensor 31 detecting that a virtual blaster fire from a toy gun has hit t-shirt 70 and/or wireless communication device 30. Based on the number of times one or more of haptic generator 33, display 34, and/or speaker 35 provided reaction effects, reaction effects may be changed. For example, each time that a virtual blaster fire from the toy gun hits t-shirt 70 and/or wireless communication device 30, one or more of intensity and/or length of the reaction effects may be increased (e.g., the first blaster fire results in a small vibration, the second blaster fire results in a medium vibration, the third blaster fire results in a strong vibration, etc.).

As another example, when t-shirt 70 and/or wireless communication device 30 has been hit by the virtual blaster fire a certain number of times, the type of reaction effect may be changed (e.g., the first two hits may results in different lengths of medium vibration, and the third hit may result in a shorter length of strong vibration and a sound stating, "The battle armor is damaged," etc.). As another example, the length of time between executed reaction effects and a new reaction effect may change the new reaction effect (e.g., two hits spaced apart by ten seconds may result in the second hit generating red flashing light by display 34 while two hits spaced apart by ten minutes may result in the second hit generating yellow light by display 34, etc.). Other types of reaction effects based on stored information about executed reaction effects are contemplated.

In some implementations, stored information about executed reaction effects may be retained when wireless communication device 30 is transferred between objects. For example, wireless communication device 30 may store information about executed reaction effects based on the virtual blaster fire hitting t-shirt 70 and/or wireless communication device 30 three times. Wireless communication device 30 may then be switched to toy dog 80 to simulate an internet of things capability in toy dog 80 (e.g., as shown in FIGS. 3A-3D). After one or more reaction effects based on communication from a microphone are executed, wireless communication device 30 may be switched back to t-shirt 70. Reaction effects for t-shirt 70 may be based on stored information about the virtual blaster fire having already hit t-shirt 70 and/or wireless communication device 30 three times. Such use of stored information about executed reaction effects may allow a user to continue the prior experience of using wireless communication device 30 with t-shirt 70.

Figure 4:
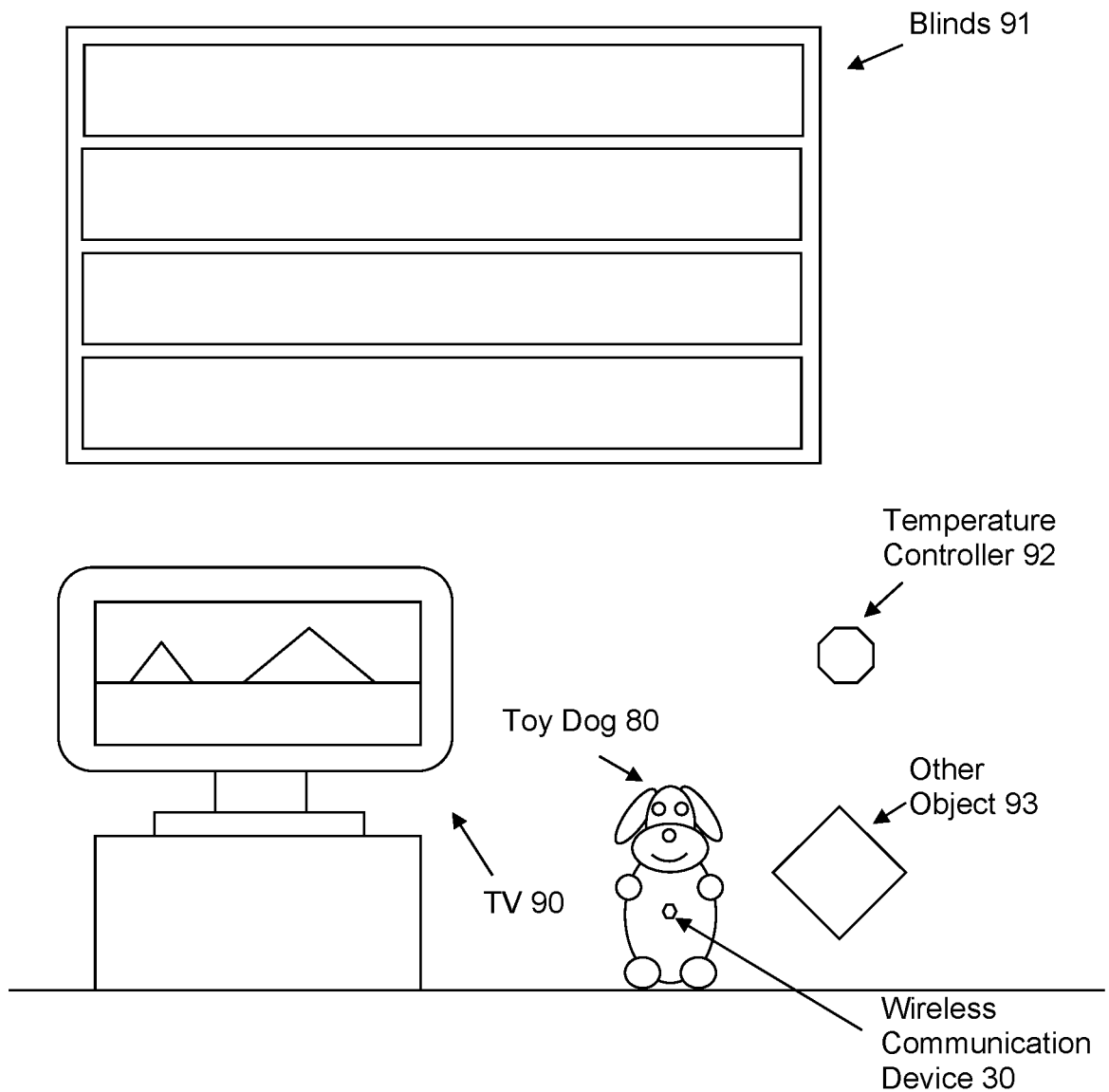
FIG. 4 illustrates an examples of a wireless communication device interacting with internet of things devices.

FIG. 4 illustrates an examples of wireless communication device 30 interacting with internet of things devices to simulate internet of things capability in an object. In FIG. 4, wireless communication device 30 may be attached to toy dog 80. Input component 51 may receive input indicating an object association between wireless communication device 30 and toy dog 80. The object association between wireless communication device 30 and toy dog 80 may include an object type of a toy dog and an object role of a pet. Reaction component 52 may activate a set of reactions for wireless communication device 30. The set of reactions may be specific to the object type of a toy dog and/or the object role of a pet.

Based on detection of one or more reaction criteria by sensor 31, one or more reaction effects may be executed through one or more feedback capabilities 32. For example, sensor 31 may detect that TV 90 is on based on a detection of one or more visuals by an image sensor and/or one or more communication from TV 90. In response, one or more reaction effects may be executed through one or more feedback capabilities 32 of wireless communication device 30. For example, a reaction may define generation of an audio feedback and speaker 35 may be operated to generate one or more audio effects to simulate toy dog 80 making sounds (e.g., barking sounds, sounds about watching TV 90 together, sounds about how long TV 90 has been on, etc.).

As another example, sensor 31 may detect that blinds 91 is opening based on a detection of one or more visuals by an image sensor and/or one or more communication from blinds 91. In response, one or more reaction effects may be executed through one or more feedback capabilities 32 of wireless communication device 30. For example, a reaction may define generation of a visual feedback and display 34 may be operated to generate one or more visual effects to simulate toy dog 80 providing visuals (e.g., text message stating "Let's go out," visuals indicating temperature and/or weather outside, etc.).

As another example, sensor 31 may detect that temperature controller 92 is operating based on detection of one or more temperature by a temperature sensor and/or one or more communication from temperature controller 92. In response, one or more reaction effects may be executed through one or more feedback capabilities 32 of wireless communication device 30. For example, a reaction may define generation of a visual feedback and display 34 may be operated to generate one or more visual effects to simulate toy dog 80 providing visuals (e.g., text message stating "It's cold," visuals indicating temperature inside, etc.). As another example, a reaction may define generation of a haptic feedback and haptic generator 33 may be operated to generate one or more haptic effects to simulate toy dog 80 shaking from the cold.

As another example, sensor 31 may detect a certain operation of other object 93 based on detection of one or more sensors and/or one or more communication from other object 93. In response, one or more reaction effects may be executed through one or more feedback capabilities 32 of wireless communication device 30. Other types of object association, reaction criteria and reaction effects are contemplated.

In some implementations, feedback capabilities 32 of wireless communication device 30 may include capability to generate feedback via operation of an augmented reality (AR) display device. The AR display device may be configured to display an overlay image. Visual effects may be included in an overlay image, and the overlay image may be displayed by the AR display device. Based on detection of one or more reaction criteria by sensor 31, one or more reaction effects may be executed through one or more feedback capabilities 32. For example, a reaction may define generation of a visual feedback and the AR display device may be operated to generate one or more visual effects to augment the appearance of wireless communication device 30 and/or an object. For example, in response to t-shirt 70 and/or wireless communication device 30 being hit by a virtual blaster fire, the AR display device may be operated to generate virtual blaster sparks and/or smoke appearing to be coming from t-shirt 70 and/or wireless communication device 30. Other types of object association, reaction criteria and reaction effects are contemplated.

In some implementations, the AR display device may include one or more of a head-mounted display, an optical head-mounted display, a see-through display, an optical see-through display, a video see-through display, a visor, eyeglasses, sunglasses, a smartphone, a tablet, a mobile device, a projector, and/or other displays. In some implementations, the AR display device may be operated to allow light to be passed through the AR display device in portions in which the overlay image does not contain the visual effect. For example, the AR display device may include one or more of an optical head-mounted display and a user of the AR display device may see light from the real world as well as the overlay image. In some implementations, the transparency of one or more portions of the AR display device may be changed. For example, the transparency of one or more portions of the AR display device corresponding to the visual effect may be changed to block light from the real world passing through the AR display device.

Although storage media 11, wireless communication device 30, and processor 40 are shown to be connected to a network 60 in FIG. 1, any communication medium may be used to facilitate interaction between any components of system 10. One or more components of system 10 may communicate with each other through hard-wired communication, wireless communication, or both. For example, processor 40 may wirelessly communicate with storage media 11. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 40 is shown in FIG. 1 as a single entity, this is for illustrative purposes only. In some implementations, processor 40 may comprise a plurality of processing units. These processing units may be physically located within the same device, or processor 40 may represent processing functionality of a plurality of devices operating in coordination.

Processor 40 may be configured to execute one or more of input component 51, reaction component 52, and/or other components by software; hardware; firmware; some combination of software, hardware, and/or firmware; and/or other mechanisms for configuring processing capabilities on processor 40.

It should be appreciated that although input component 51 and reaction component 52 are illustrated in FIG. 1 as being co-located within a single processing unit, in implementations in which processor 40 comprises multiple processing units, one or more of input component 51 and/or reaction component 52 may be located remotely from the other computer program components.

The description of the functionality provided by the different computer program components 51 and/or 52 described herein is for illustrative purposes, and is not intended to be limiting, as any of computer program components 51 and/or 52 may provide more or less functionality than is described. For example, one or more of computer program components 51 and/or 52 may be eliminated, and some or all of its functionality may be provided by other computer program components 51 and/or 52. As another example, processor 40 may be configured to execute one or more additional computer program components that may perform some or all of the functionality attributed to one or more of computer program components 51 and/or 52.

Although sensor 31 is depicted in FIG. 1 as a single element, this is not intended to be limiting. Sensor 31 may include one or more image sensors in one or more locations.

Although haptic generator 33 is depicted in FIG. 1 as a single element, this is not intended to be limiting. Haptic generator 33 may include one or more haptic generators in one or more locations.

Although display 34 is depicted in FIG. 1 as a single element, this is not intended to be limiting. Display 34 may include one or more displays in one or more locations.

Although speaker 35 is depicted in FIG. 1 as a single element, this is not intended to be limiting. Display 34 may include one or more speakers in one or more locations.

The electronic storage media of storage media 11 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Storage media 11 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Storage media 11 may be a separate component within system 10, or storage media 11 may be provided integrally with one or more other components of system 10 (e.g., processor 40). Although storage media 11 is shown in FIG. 1 as a single entity, this is for illustrative purposes only. In some implementations, storage media 11 may comprise a plurality of storage units. These storage units may be physically located within the same device, or storage media 11 may represent storage functionality of a plurality of devices operating in coordination.

Figure 5:
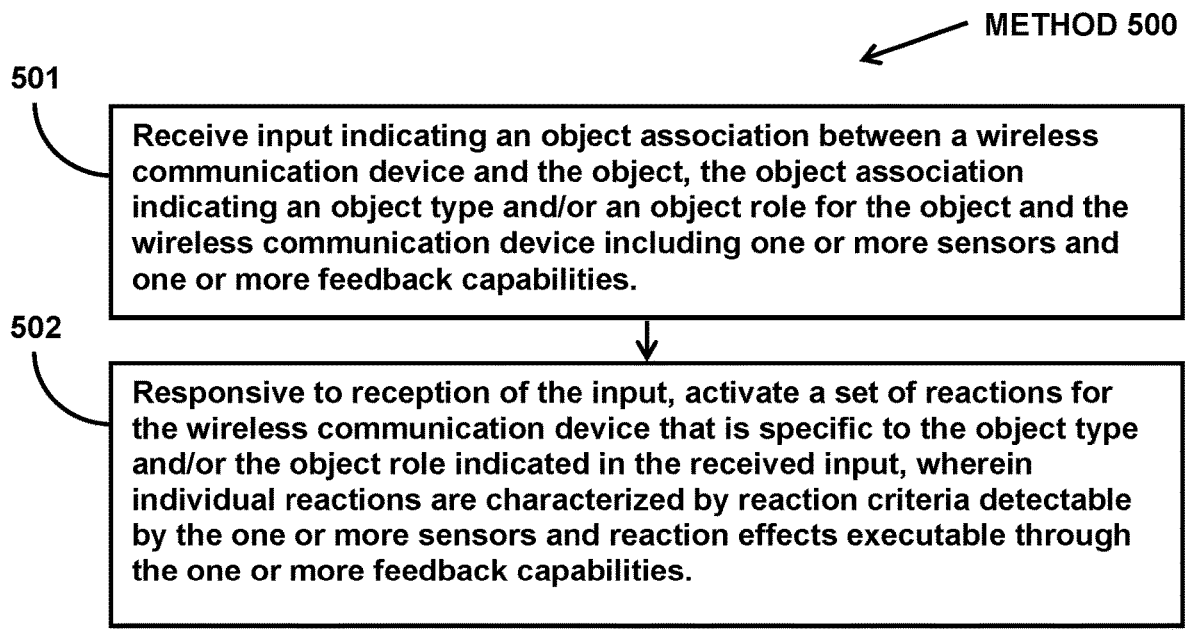
FIG. 5 illustrates a method for simulating an internet of things capability in an object.

FIG. 5 illustrates method 500 for simulates an internet of things capability in an object. The operations of method 500 presented below are intended to be illustrative. In some implementations, method 500 may be accomplished with one or more additional operations not described, and/or without one or more of the operations discussed. In some implementations, two or more of the operations may occur substantially simultaneously.

In some implementations, method 500 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 500 in response to instructions stored electronically on one or more electronic storage mediums. The one or more processing devices may include one or more devices configured through hardware, firmware, and/or software to be specifically designed for execution of one or more of the operations of method 500.

Referring to FIG. 5 and method 500, at operation 501, input indicating an object association between a wireless communication device and an object may be received. The object association may indicate an object type and/or an object role for the object. The wireless communication device may include one or more sensors and one or more feedback capabilities. In some implementations, operation 501 may be performed by a processor component the same as or similar to input component 51 (shown in FIG. 1 and described herein).

At operation 502, responsive to reception of the input, a set of reactions for the wireless communication device that is specific to the object type and/or the object role indicated in the received input. Reactions executable by the wireless communication device may be stored in storage media. Individual reactions may be characterized by reaction criteria detectable by the one or more sensors and reaction effects executable through the one or more feedback capabilities. The reactions may include a first reaction characterized by first reaction criteria and a first reaction effect. The set of reactions may include the first reaction. The first reaction may cause the wireless communication device to execute the first reaction effect through the one or more feedback capabilities in response to detection of the first reaction criteria so that the object appears to be executing the first reaction effect. In some implementations, operation 502 may be performed by a processor component the same as or similar to reaction component 52 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that simulates an internet of things capability in an object, the system comprising:
    storage media storing sets of reactions executable by a wireless communication device, individual sets of reactions being specific to individual object types and/or individual object roles of objects, the wireless communication device including one or more sensors and one or more feedback capabilities, wherein individual reactions are characterized by reaction criteria detectable by the one or more sensors and reaction effects executable through the one or more feedback capabilities, the sets of reactions including a first set of reactions and a second set of reactions, the first set of reactions being specific to a first object type and/or a first object role, and the second set of reactions being specific to a second object type and/or a second object role, the first set of reactions including a first reaction characterized by first reaction criteria and a first reaction effect, the second set of reactions including a second reaction characterized by second reaction criteria and a second reaction effect; and
    one or more processors configured by machine readable instructions to:
        receive input indicating an object association between the wireless communication device and the object, the object association indicating the individual object type and/or the individual object role for the object; and
        activate, based on the input, an individual set of reactions included the sets of reactions, such that:
            responsive to reception of the input indicating the first object type and/or the first object role for the object, activate the first set of reactions for the wireless communication device, the first set of reactions including the first reaction which causes the wireless communication device to execute the first reaction effect through the one or more feedback capabilities in response to detection of the first reaction criteria so that the object appears to be executing the first reaction effect; and
            responsive to reception of the input indicating the second object type and/or the second object role for the object, activate the second set of reactions for the wireless communication device, the second set of reactions including the second reaction which causes the wireless communication device to execute the second reaction effect through the one or more feedback capabilities in response to detection of the second reaction criteria so that the object appears to be executing the second reaction effect.

2. The system of claim 1, wherein the wireless communication device is attachable to the object.

3. The system of claim 2, wherein the wireless communication device is attachable to the object via one or more of an adhesive, a hook, a clip, a magnet, and/or a pin.

4. The system of claim 1, wherein the one or more feedback capabilities includes one or more capabilities to generate of a haptic feedback, a visual feedback, and/or an audio feedback.

5. The system of claim 4, wherein the wireless communication device includes one or more of a haptic generator, a display, and/or a speaker.

6. The system of claim 1, wherein the one or sensors include one or more of an image sensor, an audio sensor, a temperature sensor, a humidity sensor, a proximity sensor, a pressure sensor, an accelerometer, an angular rate sensor, a gyroscope, a geolocation sensor, a magnetometer, a vibration sensor, a light detection sensor, and/or a physiological sensor.

7. The system of claim 1, wherein the one or more sensors include one or more of a radio communication device, a Bluetooth communication device, a Wi-Fi communication device, a cellular communication device, and/or an infrared communication device.

8. The system of claim 1, wherein the one or more processors are located in the wireless communication device.

9. The system of claim 1, wherein the one or more processors are located remotely from the wireless communication device.

10. A method that simulates an internet of things capability in an object, the method comprising:
    storing sets of reactions executable by a wireless communication device, individual sets of reactions being specific to individual object types and/or individual object roles of objects, the wireless communication device including one or more sensors and one or more feedback capabilities, wherein individual reactions are characterized by reaction criteria detectable by the one or more sensors and reaction effects executable through the one or more feedback capabilities, the sets of reactions including a first set of reactions and a second set of reactions, the first set of reactions being specific to a first object type and/or a first object role, and the second set of reactions being specific to a second object type and/or a second object role, the first set of reactions including a first reaction characterized by first reaction criteria and a first reaction effect, the second set of reactions including a second reaction characterized by second reaction criteria and a second reaction effect;

receiving input indicating an object association between the wireless communication device and the object, the object association indicating the individual object type and/or the individual object role for the object; and activating, based on the input, an individual set of reactions included the sets of reactions, including:

responsive to reception of the input indicating the first object type and/or the first object role for the object, activating the first set of reactions for the wireless communication device, the first set of reactions including the first reaction which causes the wireless communication device to execute the first reaction effect through the one or more feedback capabilities in response to detection of the first reaction criteria so that the object appears to be executing the first reaction effect; and responsive to reception of the input indicating the second object type and/or the second object role for the object, activating the second set of reactions for the wireless communication device, the second set of reactions including the second reaction which causes the wireless communication device to execute the second reaction effect through the one or more feedback capabilities in response to detection of the second reaction criteria so that the object appears to be executing the second reaction effect.

11. The method of claim 10, wherein the wireless communication device is attachable to the object.

12. The method of claim 11, wherein the wireless communication device is attachable to the object via one or more of an adhesive, a hook, a clip, a magnet, and/or a pin.

13. The method of claim 10, wherein the one or more feedback capabilities includes one or more capabilities to generate of a haptic feedback, a visual feedback, and/or an audio feedback.

14. The method of claim 13, wherein the wireless communication device includes one or more of a haptic generator, a display, and/or a speaker.

15. The method of claim 10, wherein the one or sensors include one or more of an image sensor, an audio sensor, a temperature sensor, a humidity sensor, a proximity sensor, a pressure sensor, an accelerometer, an angular rate sensor, a gyroscope, a geolocation sensor, a magnetometer, a vibration sensor, a light detection sensor, and/or a physiological sensor.

16. The method of claim 10, wherein the one or more sensors include one or more of a radio communication device, a Bluetooth communication device, a Wi-Fi communication device, a cellular communication device, and/or an infrared communication device.

17. The method of claim 10, wherein one or more processors are configured by machine readable instructions to perform the steps of receiving the input indicating the object association and activating the individual set of reactions, the one or more processors being located in the wireless communication device.

18. The method of claim 10, wherein one or more processors are configured by machine readable instructions to perform the steps of receiving the input indicating the object association and activating the individual set of reactions, the one or more processors being located remotely from the wireless communication device.

19. A system that simulates an internet of things capability in an object, the system comprising:

storage media storing sets of reactions executable by a wireless communication device, individual sets of reactions being specific to individual object types and/or individual object roles of objects, the wireless communication device being attachable to the object, the wireless communication device including one or more sensors and one or more feedback capabilities, the one or more feedback capabilities including one or more capabilities to generate of a haptic feedback, a visual feedback, and/or an audio feedback, wherein individual reactions are characterized by reaction criteria detectable by the one or more sensors and reaction effects executable through the one or more feedback capabilities, the sets of reactions including a first set of reactions and a second set of reactions, the first set of reactions being specific to a first object type and/or a first object role, and the second set of reactions being specific to a second object type and/or a second object role, the first set of reactions including a first reaction characterized by first reaction criteria and a first reaction effect, the second set of reactions including a second reaction characterized by second reaction criteria and a second reaction effect; and one or more processors configured by machine readable instructions to:

receive input indicating an object association between the wireless communication device and the object, the object association indicating the individual object type and/or the individual object role for the object; and activate, based on the input, an individual set of reactions included the sets of reactions, such that:

responsive to reception of the input indicating the first object type and/or the first object role for the object, activate the first set of reactions for the wireless communication device, the first set of reactions including the first reaction which causes the wireless communication device to execute the first reaction effect through the one or more feedback capabilities in response to detection of the first reaction criteria so that the object appears to be executing the first reaction effect; and responsive to reception of the input indicating the second object type and/or the second object role for the object, activate the second set of reactions for the wireless communication device, the second set of reactions including the second reaction which causes the wireless communication device to execute the second reaction effect through the one or more feedback capabilities in response to detection of the second reaction criteria so that the object appears to be executing the second reaction effect.

20. The system of claim 19, wherein the wireless communication device includes one or more of a haptic generator, a display, and/or a speaker.

* * * * *